HENRY J. STIELPER
WILBUR T. ASH
RICHARD D. WEAVER
GLENN W. RANDOLPH
INVENTORS

BY
*Killman, Smith & Lamb*
ATTORNEYS

HENRY J. STIELPER
WILBUR T. ASH
RICHARD D. WEAVER
GLENN W. RANDOLPH
INVENTORS

BY
Killman, Smith & Lamb
ATTORNEYS

United States Patent Office 3,232,128
Patented Feb. 1, 1966

3,232,128
FRICTION DRIVE FOR AN AUTO RADIO
SIGNAL SEEKING DEVICE
Glenn W. Randolph, Henry J. Stielper, and Wilbur T. Ash, Baltimore, and Richard D. Weaver, Timonium, Md., assignors to The Bendix Corporation, Baltimore, Md., a corporation of Delaware
Filed Sept. 18, 1963, Ser. No. 309,756
3 Claims. (Cl. 74—202)

This invention relates to drive mechanisms, and in particular to an improved friction drive mechanism for use in automatic radio signal seeking devices and the like.

In radio signal seeking drive units, there is a need for highly efficient, fast reacting and quiet running drive mechanisms. Signal seeking drive mechanisms for commercial radios must be inexpensive to produce, and preferably quite small in size. Thus it is necessary to use a small, rapidly turning motor plus a very substantial amount of gear reduction. Engaging and disengaging means must be very fast, i.e. responding to an input signal by disengaging within two or three kilocycles on the tuning band.

Heretofore, worm gear drive units and magnetic clutch type signal seeking drive mechanisms have been used but have not provided the quality of operation desired. Small inexpensive gear trains with large gear reductions have tended to be noisy, the noise increasing with use and wear. Also, where worm gear arrangements have been used, mechanical efficiency has been poor, thereby requiring that a substantial force be available to drive them. Such gear trains have also been a source of servicing problems. Accordingly, it is an object of this invention to provide a drive mechanism of the type described that substantially reduces noise common to operation of this type drive mechanism.

It is another object of this invention to provide a drive mechanism of the type described which maintains a high working efficiency.

A further object of this invention is to provide a drive mechanism of the type described which is simple in construction and operation but has a high degree of reliability.

Yet another object of this invention is to provide a drive mechanism of the type described which includes a means to compensate for manufacturing tolerances and wear in certain major drive parts.

A still further object of this invention is to produce a drive of the type described which accomplishes the above objectives and which can be produced at a somewhat lower cost than types presently in use.

Briefly stated, our improved signal seeking drive mechanism consists essentially of a drum encircling a plurality of idler wheels which are held in continuous friction contact with a reversible drive shaft. The idlers are capable of being moved in a plane normal to their axis. Parallel arms connect the idlers with an engage-disengage control device so that when the control device is energized, the idlers are moved into frictional contact with the inner periphery of the drum; whereupon rotation of the idlers from the drive shaft causes the drum to rotate. Rotary motion of the drum is then transmitted to the output shaft through final gear reduction means.

The invention will be better understood from the detailed description which follows herebelow, and the drawings in which.

Figure 1:
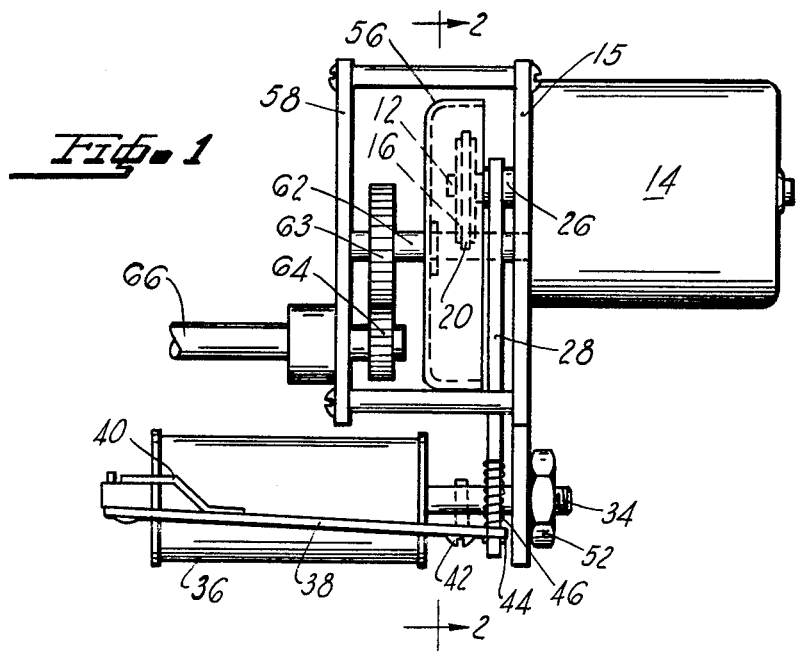
FIGURE 1 is a side elevation of the improved drive mechanism and, including in dotted outline, the idler alignment.
Figure 2:
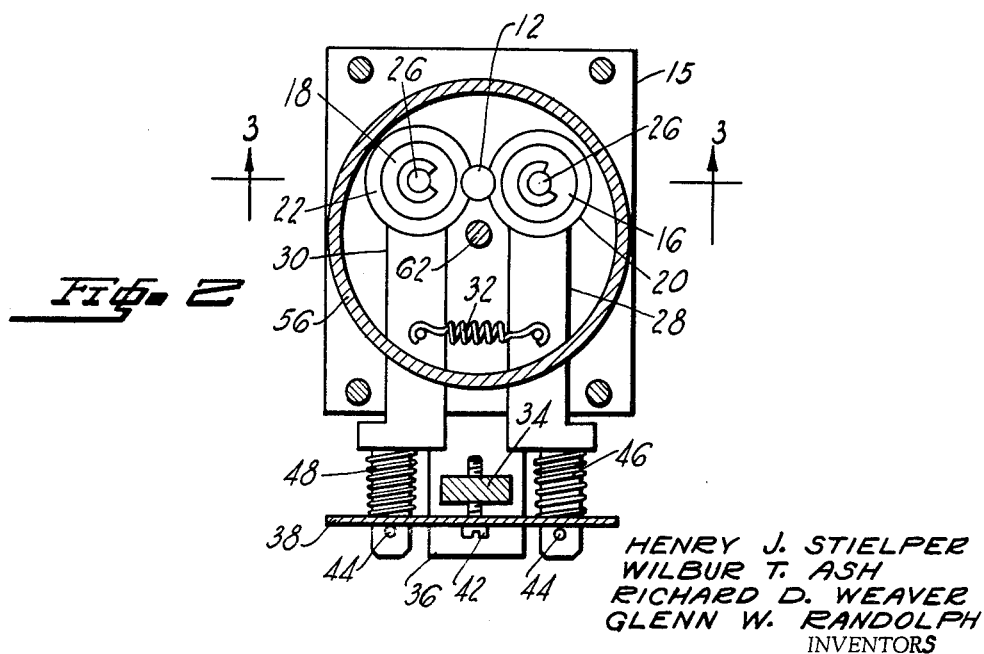
FIGURE 2 is a view taken generally along the line 2—2 of FIGURE 1 showing the drive mechanism in a disengaged position.
Figure 3:
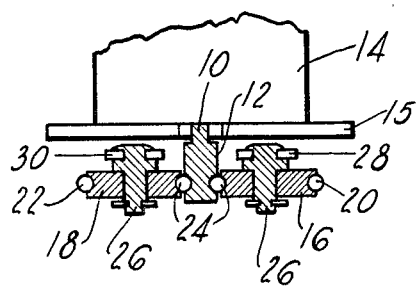
FIGURE 3 is a view taken generally along the line 3—3 of FIGURE 2.

Referring first to FIGURES 1 to 3 inclusive, a motor shaft 10 with a hub 12 is driven by a conventional reversible motor shown generally at 14. Motor 14 is mounted on plate 15 in any suitable manner.

Idlers 16 and 18 are fastened by conventional means to stub shafts 26 which are carried on a pair of arms 28 and 30 in such manner that rotary motion of the idlers on shafts 26 is not impaired. The idlers are provided with O-rings 20 and 22 of rubber or of other appropriate material having good non-skid characteristics.

As best seen in FIGURE 3, hub 12 is provided with an annular groove 24. Idlers 16 and 18 are arranged on opposite sides of hub 12 so that O-rings 20 and 22 frictionally engage hub 12 in groove 24. This construction serves to prevent relative movement of the idlers in an axial direction.

A spring 32 (FIG. 2), attached between the parallel arms 28 and 30, exerts an inward force on both arms with the result that idlers 16 and 18 are held in continuous contact with hub 12. Any operation of motor 14 drives the idlers because of the friction contact of the idlers with the hub.

Figure 4:
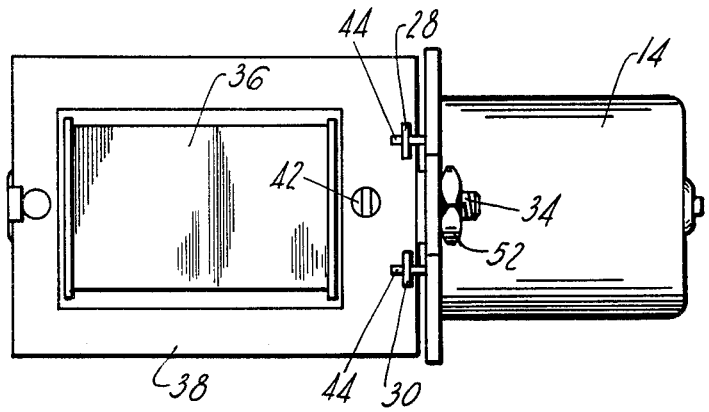
FIGURE 4 is a bottom view of the drive mechanism showing the armature plate configuration.

Arms 28 and 30 connect idlers 18 and 16 with a clutch engage-disengage control device. This control device consists generally of an iron core member 34, a coil 36, shown enclosed, an armature plate 38, a return spring 40, and an air gap adjustment screw 42, constructed as shown in FIGURES 1, 2, and 4. Armature plate 38 is provided with slots through which the lower ends of arms 28 and 30 extend; a pair of pins 44 being used to keep the arms engaged with the armature plate. The control device is attached to plate 15 by means of a nut 52 placed on the threaded end of core 34. The air gap adjustment screw 42 threads into core 34. The hole in armature plate 38 is slightly larger than the body of screw 42 so that armature plate 38 can be moved through the air gap distance, i.e. the distance between the bottom of core 34 and the head of screw 42. A pair of light springs 46 and 48 urge arms 28 and 30 away from armature plate 38, and are for the purpose of absorbing manufacturing tolerances, assembly tolerances and wear that could exist between the pulley arms 28 and 30. Since both arms move as a single unit and both O-rings 20 and 22 must contact the inner rim of drum 56, if one arm is longer than the other, the spring on that arm will compress until the other O-ring contacts the drum.

A drum 56 encircles idlers 16 and 18 and hub 12 and is carried on a shaft 62 rotatably supported in plate 15 and in a front plate 58 by any suitable means. The drum is capable of rotary motion about its axis and is frictionally driven by idlers 16 and 18. When the control device is actuated, the idlers are moved into contact with the inner rim of the drum.

The output shaft 66 is driven by gear reduction means including spur gears 63 and 64 which are continuously engaged. Gear 63 is mounted on shaft 62 and rotates therewith, and gear 64 is mounted on output shaft 66. Shaft 62 is integrally connected to drum 56 so that any rotation of the drum also rotates gear 63 whereby gear 64 and output shaft 66 are caused to rotate.

In operation, the shaft 10 and hub 12 may be rotated in either direction. If it is rotated in a clockwise direction, for example, the idlers will be rotated in a counterclockwise direction. The O-ring idlers have a self-energizing effect for increasing the contact pressure upon the input shaft and rim of the drum when in the engaged position. Assuming a clockwise motion of the input shaft, hub 12 tends to carry idler 18 upward (FIG. 2) and into contact with drum 56 while idler 16 tends to move down and away from the drum. As a result, idler 18 tends to wedge itself between the drum and hub 12 and in so doing, continually presses against the inner rim of the drum, thereby becoming the primary driving force for the drum. In counter-clockwise motion of the input shaft 10, idler 16 becomes the primary driving force for drum 56. Because of the self-energizing effect of the idlers, full motor horsepower can be utilized for the input shaft. Further r.p.m. reduction and torque increase for the output shaft 66 from the drum is obtained through the final spur gear reduction.

It should be noted that there is never any coupling or drag between the input and output shafts when the idlers are disengaged from the drum. Nor is there any rotary motion of the output shaft when the idlers are engaged or disengaged from the drum with the input shaft stationary. By using the tolerance springs 46 and 48, high-precision manufacturing techniques are not required. This, in combination with the simplicity of the construction, results in low cost and high reliability.

It should be understood that this invention in its broader aspects is not limited to the specific embodiment herein illustrated and described, and that the following claims are intended to cover all changes and modifications that do not depart from the true spirit and scope of the invention.

I claim:
1. A drive mechanism for radio signal seeking mechanism comprising:
   a reversible drive motor including a driving shaft provided with a circumferential groove;
   a plurality of idlers adapted to be driven by said shaft, and a resilient O-ring fitted to the outer rim of each of said idlers;
   resilient means holding said idlers in continuous contact with said driving shaft such that said groove receives said idler O-rings, thereby preventing axial movement of said idlers;
   a drum encircling said pulleys and having an inner rim adapted to be frictionally engaged therewith;
   an electromagnetic control device for controlling the engagement and disengagement of said idlers with said drum and including a coil energizable with said motor and an armature member movable in response to energizing of said coil;
   arms connecting said armature member with each of said idlers for simultaneous actuation of said idlers against said inner rim of said drum;
   gear reduction means driven by said drum;
   and an output shaft driven by said gear reduction means.

2. A friction drive device for rotating a radio tuning mechanism comprising
   a supporting structure,
   a reversible electric motor on said supporting structure, said motor having a drive shaft;
   a pair of arms positioned on opposite sides of said shaft;
   an idler wheel mounted on each of said arms and contacting said shaft to be driven thereby;
   an open faced drum encircling both said idler wheels with the inner periphery thereof engageable by said wheels;
   a bar-like member connected between said arms at the ends opposite said idler wheels for moving said wheels into contact with said drum upon motion of said member;
   an electromagnet positioned to attract said member upon magnetization thereby urging said wheels into frictional engagement with said drum; and
   an output shaft driven by said drum.

3. A device as claimed in claim 2 wherein the connection between said arms and said bar-like member is accomplished by means of slots in said member through which the ends of said arms extend,
   stop means on the ends of said arms to prevent their retraction from said slots; and
   spring means bearing on said arms and said member for urging said member towards engagement with the stop means of said arms.

References Cited by the Examiner
UNITED STATES PATENTS

| | | | |
|---|---|---|---|
| 2,264,620 | 12/1941 | Conrad | 74—206 |
| 2,698,183 | 12/1954 | Lang | 74—210 |
| 3,129,596 | 4/1964 | Rudland | 74—190 |

DON A. WAITE, *Primary Examiner.*